W. H. SOMMER.
MACHINE FOR MANUFACTURING WIRE FENCE FABRICS.
APPLICATION FILED MAR. 9, 1916.
1,307,563.
Patented June 24, 1919.
8 SHEETS—SHEET 1.
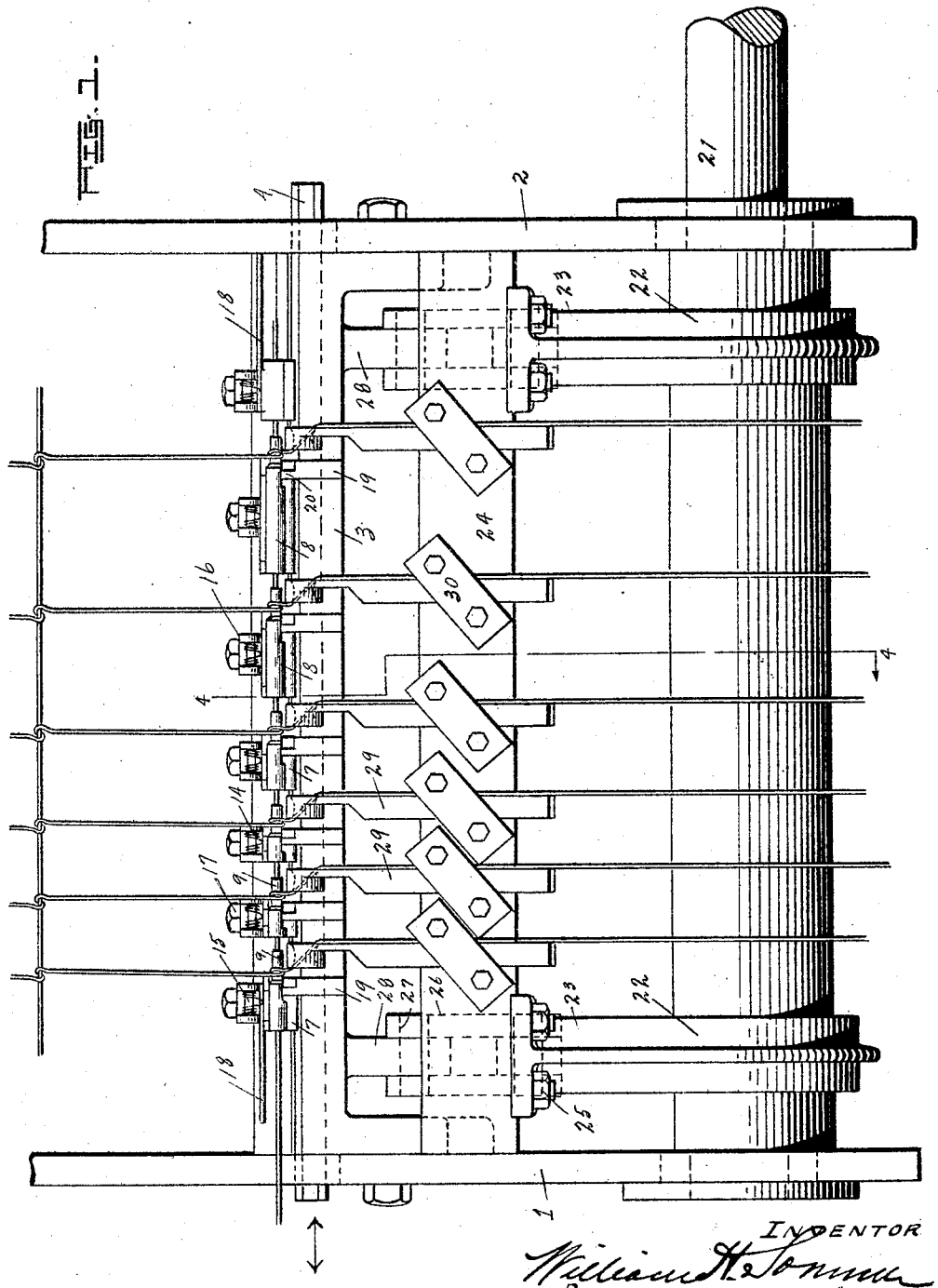

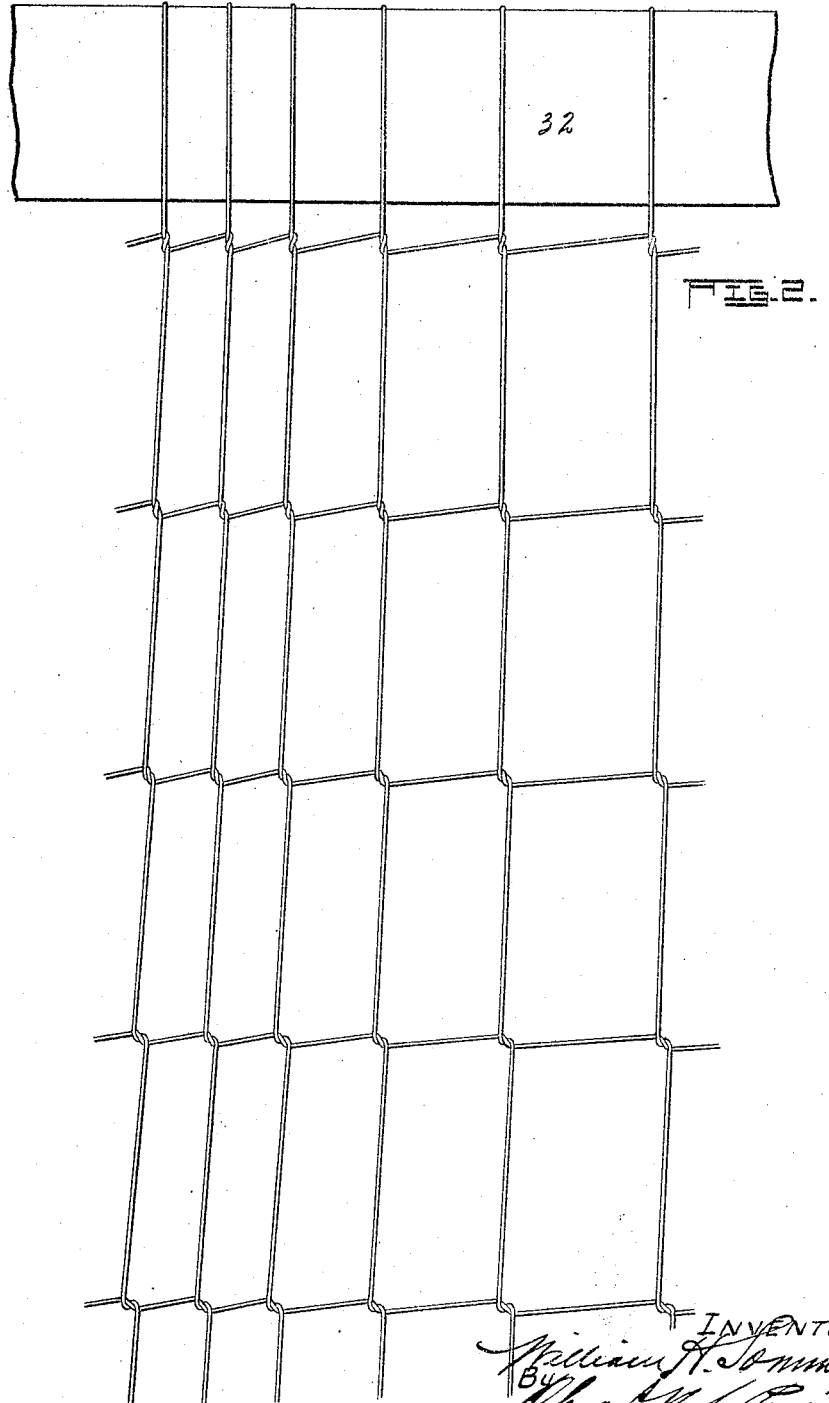

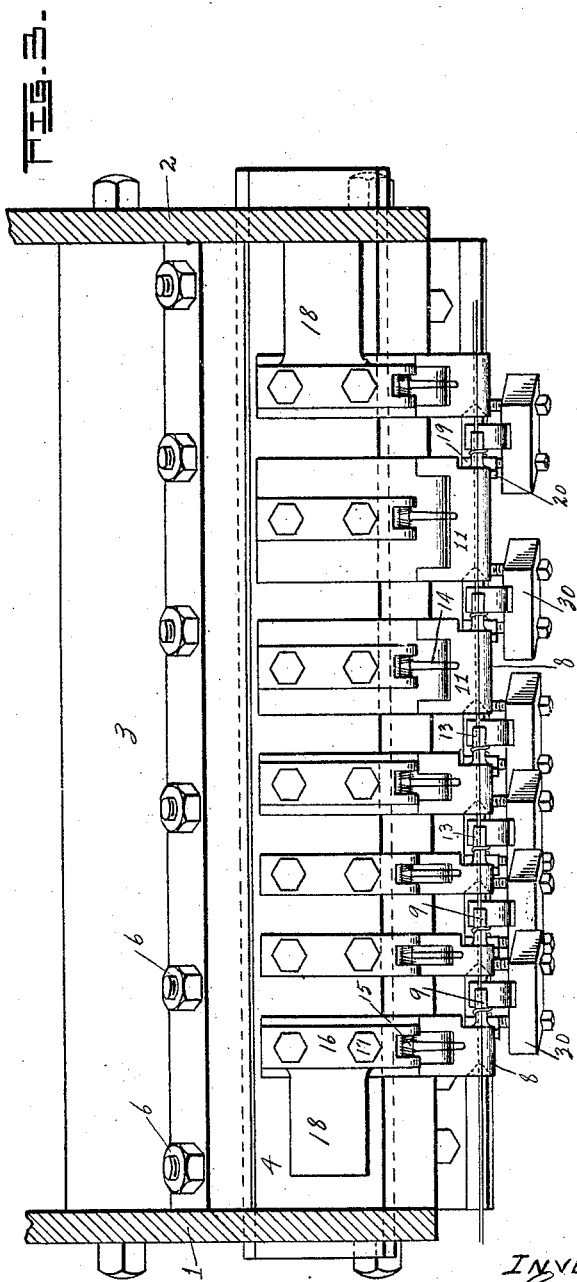

W. H. SOMMER.
MACHINE FOR MANUFACTURING WIRE FENCE FABRICS.
APPLICATION FILED MAR. 9, 1916.
1,307,563.
Patented June 24, 1919.
8 SHEETS—SHEET 4.
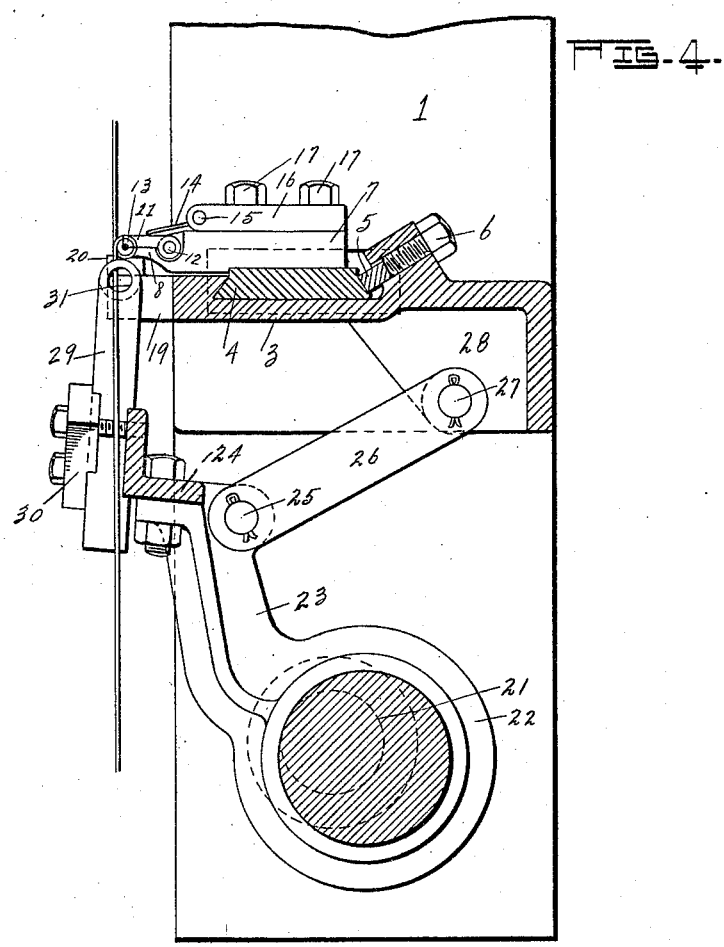

W. H. SOMMER.
MACHINE FOR MANUFACTURING WIRE FENCE FABRICS.
APPLICATION FILED MAR. 9, 1916.

1,307,563.

Patented June 24, 1919.
8 SHEETS—SHEET 5.

INVENTOR.
William H. Sommer
By Chas. H. LaPorte
ATT'Y.

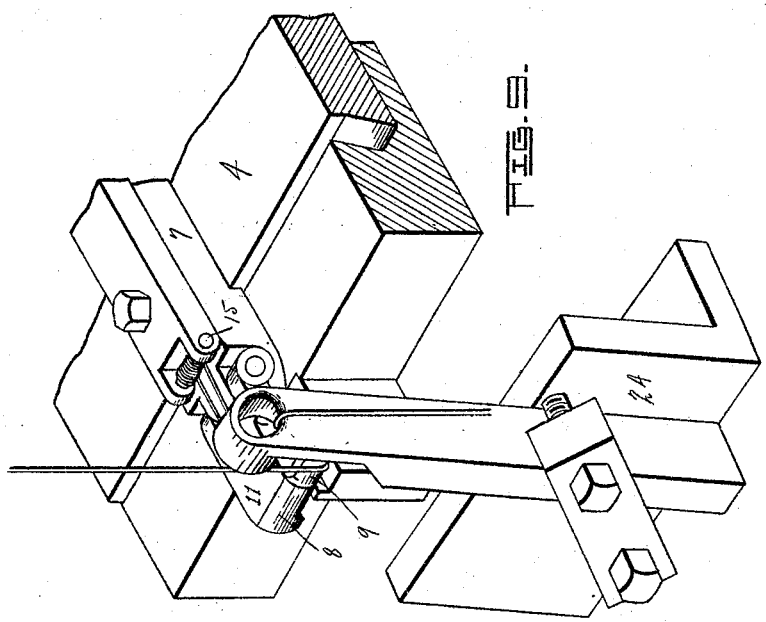
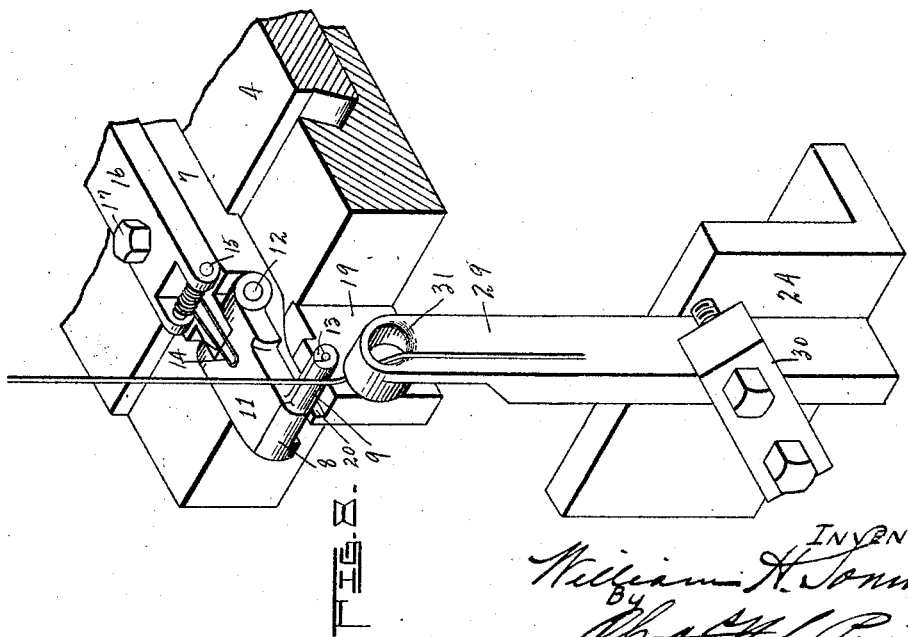

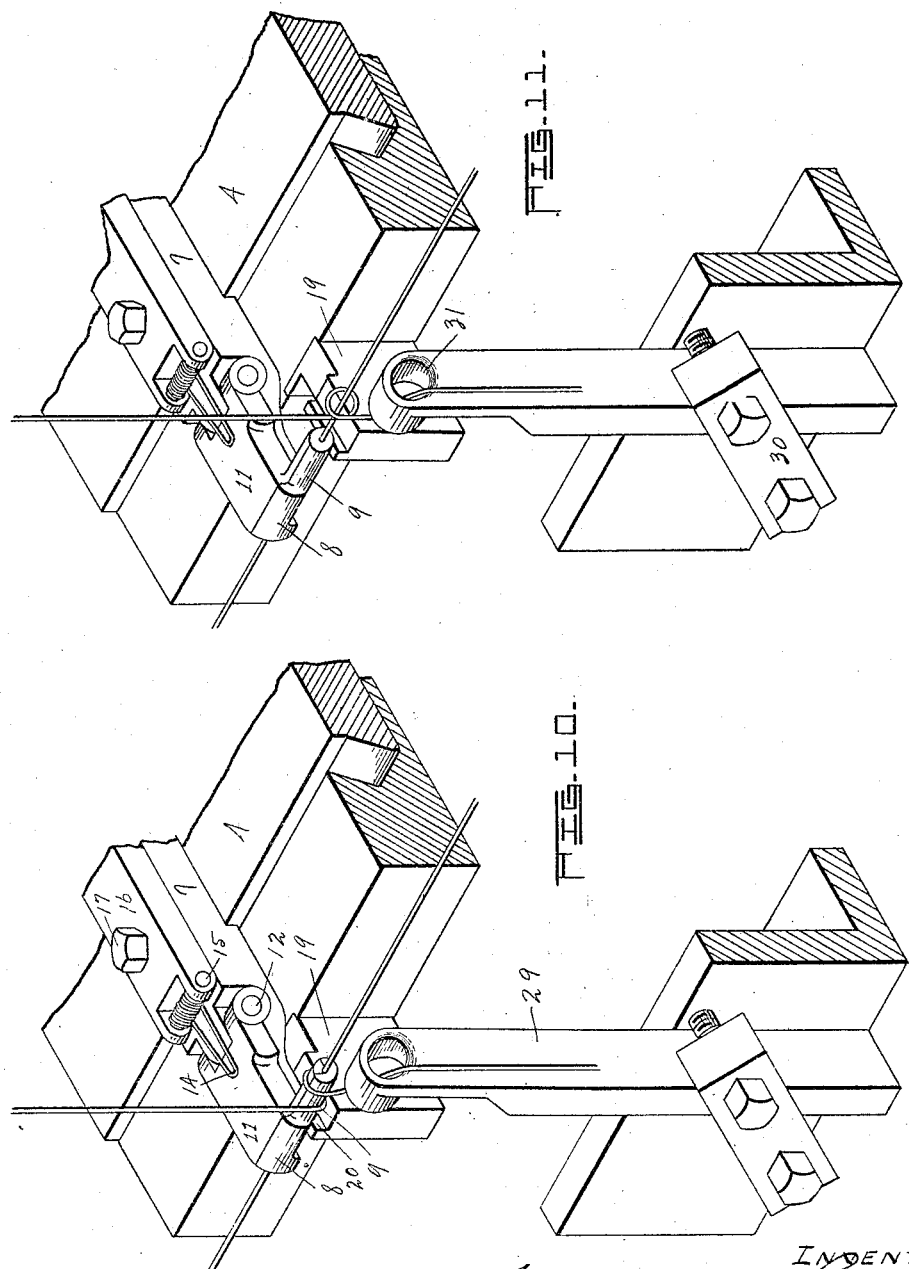

W. H. SOMMER.
MACHINE FOR MANUFACTURING WIRE FENCE FABRICS.
APPLICATION FILED MAR. 9, 1916.
1,307,563.
Patented June 24, 1919.
8 SHEETS—SHEET 8.
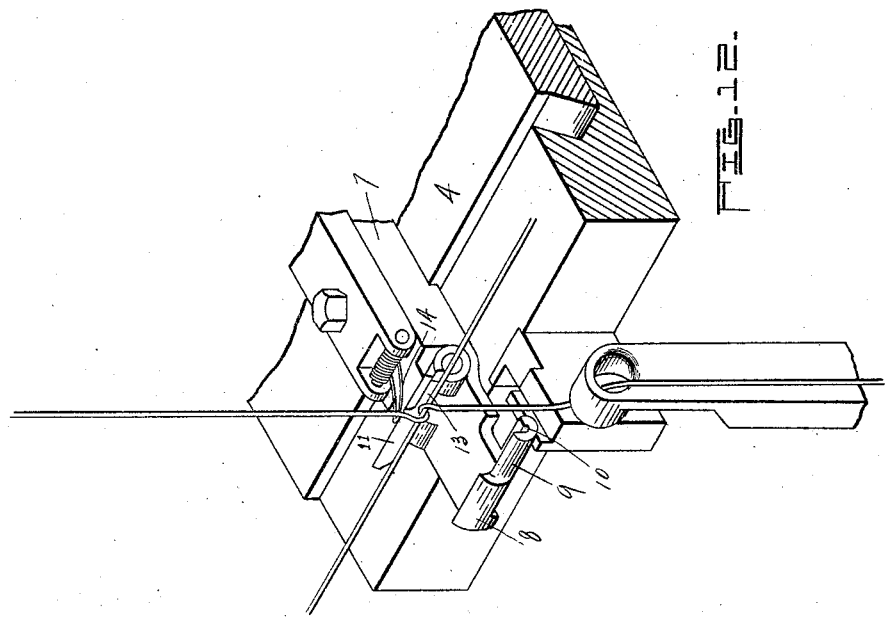
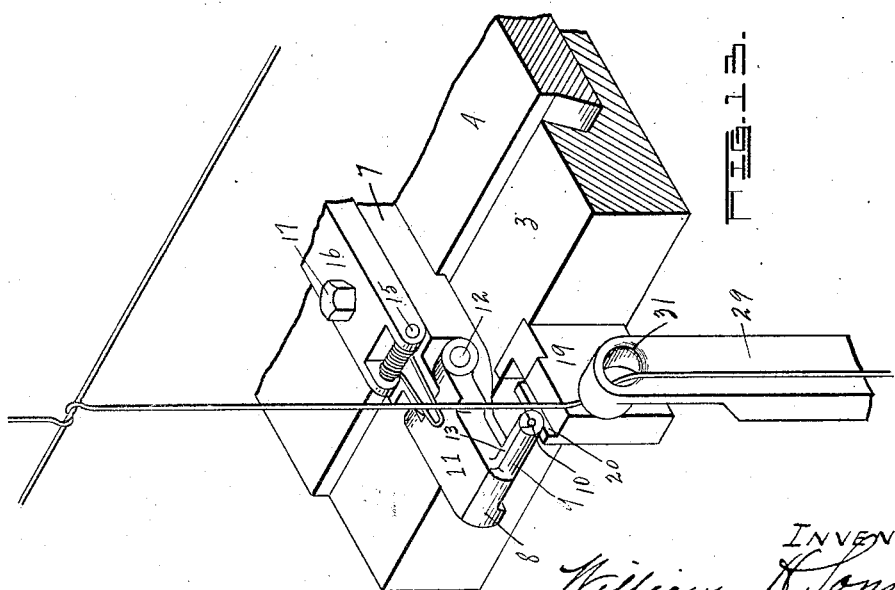

UNITED STATES PATENT OFFICE.

WILLIAM H. SOMMER, OF PEORIA, ILLINOIS, ASSIGNOR, BY MESNE ASSIGNMENTS, TO THE FIRST TRUST AND SAVINGS COMPANY, OF CLEVELAND, OHIO, A CORPORATION OF OHIO, AND WILLIAM E. STONE, OF PEORIA, ILLINOIS, TRUSTEES.

MACHINE FOR MANUFACTURING WIRE-FENCE FABRICS.

1,307,563.

Specification of Letters Patent. Patented June 24, 1919.

Application filed March 9, 1916. Serial No. 83,082.

*To all whom it may concern:*

Be it known that I, WILLIAM H. SOMMER, a citizen of the United States, residing at Peoria, in the county of Peoria and State of Illinois, have invented new and useful Improvements in Machines for Manufacturing Wire-Fence Fabrics, of which the following is a specification.

This invention has reference to machines for manufacturing wire-fence fabrics, and relates particularly to a machine for weaving that type of fence fabric, the longitudinal strand or line wires of which are formed with loops at predetermined points and the stay or picket wires threaded through said loops, and as the strand or line wires are drawn through the machine, the pulling strain or tension put upon the wires causes the loops to disappear and the strand and stay wires to become twisted together, to produce an open square-mesh fabric.

The machine is designed primarily to weave a light fence fabric, more especially adapted as a poultry fence, and such as may be galvanized before or after weaving.

One of the objects of the present invention is to provide a mechanism for forming the loops in the strand or line wires, without the use of rotating twister heads, or revolving looping devices, such as have been in common use, and thereby obviating the trouble heretofore experienced in having the loopers in a predetermined position to receive the stay or picket wires, and further, guarding against any possible deflection of the stay or picket wires from the receiving face of the twisters or loopers, necessitating the stopping of the machine and the threading in of the stay or picket wire by hand.

My invention contemplates the use of a plurality of alined stay or picket wire guides, each having a stem through which the stay or picket wire is threaded, and around which the strand or line wire is looped; said loops in the strand or line wires being partially or completely formed before the stay or picket wire is threaded through said guides, the guides being subsequently moved axially of the stay or picket wire to strip the loops therefrom and to permit the strand or line wires to have a pulling strain or tension applied thereto to cause the loops to disappear and the strand or line wires and stay or picket wires to be twisted together, to complete the fabric. The devices for producing the loops in the strand or line wires, by coiling or wrapping the same around the stems of the stay or picket wire guides, are eccentrically actuated, imparting an appropriate movement to said looping devices which move across or around the path of feed of the stay or picket wires and between the guides therefor.

With these and other objects in view, the invention consists in the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

One manner of carrying out the invention, and that which in practice has been found most desirable, is illustrated in the accompanying drawings, in which:—

Figure 1 is a front elevation of so much of a wire fence machine as is necessary to illustrate the application of my invention thereto;

Fig. 2 is a view of a piece of fabric, being a continuation of the fabric leaving the machine in Fig. 1, and showing the twisting of the strand or line wires with the stay or picket wires, resulting from the longitudinal pulling strain or tension applied thereto, and the final shrinking of the fabric when completed;

Fig. 3 is a plan view of the machine shown in Fig. 1;

Fig. 4 is a cross-section as the same would appear if taken on the line 4—4 of Fig. 1;

Fig. 8 is a perspective view of the parts shown in Fig. 5, the looper being in its normal position just prior to its operation to form the loop and before the infeed of the stay or picket wire;

Fig. 9 is a view similar to Fig. 8, except that the looper has described one-half of its movement in carrying the strand or line wire around the stem of the stay or picket wire guide;

Fig. 10 is a view similar to Fig. 8, the looper having gone through a complete cycle of movement wrapping the strand or line wire around the stem of the wire guide, and the stay or picket wire having been fed through said guide;

Fig. 11 is a view similar to Fig. 10, except that the guide has been moved causing the loop in the strand or line wire to be stripped from the stem of the guide onto the stay or picket wire;

Figure 7:
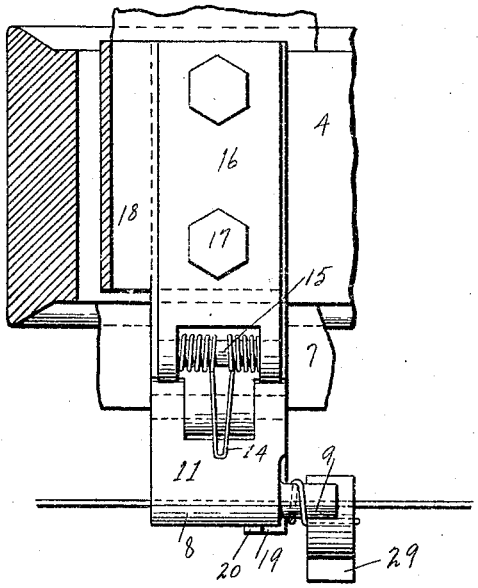
Fig. 7 is a plan view of Fig. 5.
Figure 5:
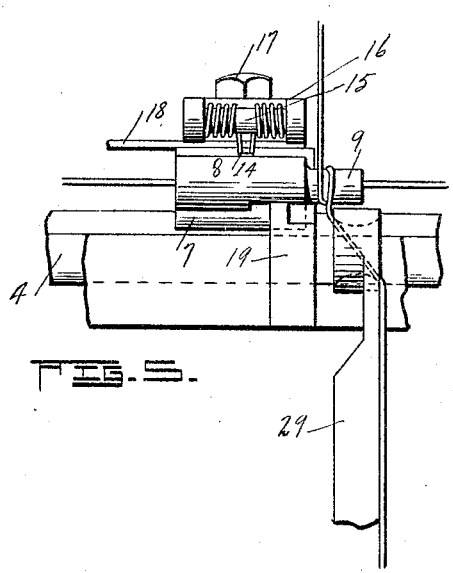
Fig. 5 is a detail in front elevation of one of the strand or line wire loopers and a stay or picket wire guide, showing a loop formed and the stay wire fed through the guide.
Figure 6:
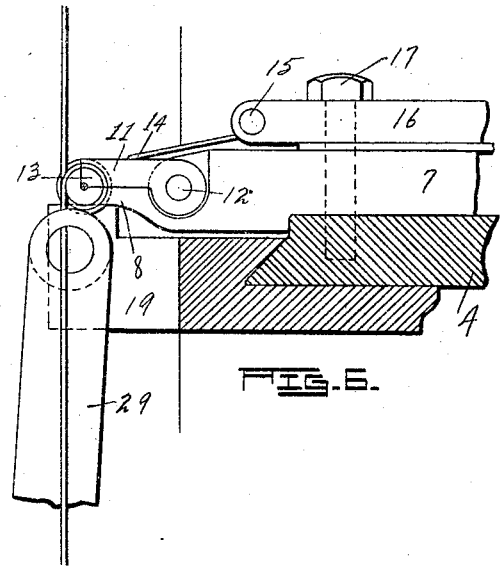
Fig. 6 is an edge view of Fig. 5.

Fig. 12 is a view similar to Fig. 11 except that a pulling strain or tension has been put on the strand or line wire to move it and the stay or picket wire a predetermined distance through the machine, or the distance at which the stay or picket wires are to be spaced from each other, such movement causing the stay or picket wire to separate the parts of the guide to allow the stay or picket wire to be released therefrom, and showing the preliminary step in twisting the strand or line wire and stay or picket wire together; and Fig. 13 is a view similar to Fig. 12, except that the strand or line wire has been drawn out sufficiently to space the stay or picket wire from the next stay or picket wire, the parts being in a position just prior to the operation of the looper, as in Fig. 8, and just prior to the complete disappearance of the loop in the strand or line wire, and the twisting together of the strand or line wire and stay or picket wire.

Like characters of reference denote corresponding parts throughout the figures.

The frame or supporting members on which the operative parts of the machine are mounted, includes the side frames or castings 1 and 2, and the transversely disposed bed plate 3. Slidable transversely of the machine and longitudinally on the bed plate 3, is a bar 4, said bar being preferably dovetailed in the bed plate 3, as best seen in Fig. 4, and retained in working position by a spacing bar 5, the latter being adjustably held or secured in position by means of the adjusting bolts 6. The opposite ends of the bar 4 pass through and are movable in slots in the side frames or castings 1 and 2, and the same may be reciprocated at predetermined intervals by any suitable operative connections with driving parts of the machine, not shown, the same having a timed relation with the other working parts of the machine, as will be further explained.

Secured to the bar 4 and disposed in suitable spaced relation thereon, are a plurality of members 7. These members have portions 8 which extend out over the front edge of the bed plate 3 to serve as wire guides to receive the stay wire as the same is fed across the machine. Each guide has a stem extension 9, and said extensions and guides are provided with a wire groove 10, and coöperating with said guides and stems are hinged plates 11, said plates hinged on pintles 12, and their forward portions, when said plates are in their lowered or normal positions, serve to close the grooves 10 but produce a circular passageway through the guides and stems for the passage of the stay wire. The extensions 9 of each guide, and the corresponding parts 13 of the plates, present a round surface on which the strand wires may be wrapped to produce the loops through which the stay wires may be fed or projected. The plates 11 and their parts 13 may be raised to allow the release of the stay wire from the guides, as the strands are drawn through the machine. Each plate 11 is yieldingly held in its lowermost or closed position by means of a spring 14, said springs being attached to pintles 15 secured to castings 16 held in place on the castings 7 by bolts 17 used for securing said last-mentioned castings on the bar 4.

The guides 8 and their stems or extensions 9 may be at graduated or uniform distances from each other, and the axis of each guide and its stem is in axial alinement with each and all of the other guides to form a continuous wire passage for the stay wire, except of course for the break created by the spacing provided between each of said guides. These guides are movable only in the direction of the length of the stay wire, or in other words, axially of the stay wire, except of course, as explained, the plates 11 coöperating therewith may be raised and lowered. The extent of movement which may be imparted to said wire guides, is determined by stop members 18, see Fig. 3, which will abut with the end castings or side frames 1 and 2, and these stop members are associated with the outer wire guides, and suitably secured to the movable bar 4 on which the wire guides are mounted.

I have not thought it necessary to show the means for reciprocating the bar 4, as that is a detail with which we are not concerned, except that the movement of the bar 4 must be in timed relation with other operative parts of the machine, to be further explained.

Projecting from the front face of the bed-plate 3, and secured thereto in any suitable manner are stripping blocks 19, and each block is provided with an angular shoulder portion 20 which is adapted to strip the loop in the strand or line wire from the stem 9 of the wire guide 8. When the wire guide is in a position for a loop to be formed thereon, the stripping portion 20 of the block 19 is normally located immediately below the guide 8, and when the guide 8 is moved sidewise with the bar 4, the stripping portion 20 of said block 19 becomes disposed beneath the stem 9 of said wire guide, and through such movement, the loop in the strand or line wire is stripped from the stem of the guide, as will be more fully explained.

Having a bearing in the side frames or castings 1 and 2 is an operating shaft 21 and the body of said shaft, between said side frames or castings, is disposed eccentrically to the axis of the bearing of said shaft, whereby movement transmitted thereby will correspond to the eccentric action thereof. On said shaft are carried eccentric straps 22, each of which has connected thereto an upwardly and forwardly extending arm 23 to which is secured and which also support a preferably angular bar 24. To the upper portions of said arm 23 are pivotally connected, at 25, links 26, and said links at their rear ends are pivotally connected, at 27, to bracket members 28 on the under side of the bedplate 3, best seen in Fig. 4.

Disposed in an upstanding or substantially vertical position, in front of the bedplate, are a plurality of looping bars or members 29. These bars are adjustably secured to the bar 24 by means of clamping blocks 30, and each bar at its upper end has a head provided with an eye 31 through which a strand wire passes and by means of which the bars 29 may lift and carry the strand wire around the stems 9 of the guides 8, so as to produce or form loops in the strand or line wires.

I have not thought it necessary to show or describe the operative connections for the shaft 21, as it may be operated in any well known way and timed in its movement relative to the other operative parts of the machine. I also have not thought it necessary to show or describe the reels or spools from which the strand or line wires are drawn, or the stay wire straightening and feeding mechanism, all of which are well known to those versed in the art; nor have I thought it necessary to show or describe the coilers for the marginal or selvage wires of the fabric, around which the ends of the stay wires are wrapped or coiled, and the operating means therefor, as such devices are in common use and well understood. It is understood, however, that the invention contemplates the use of all such means or mechanisms as are necessary to coöperate with the looping mechanism claimed. A pull-out for the fabric, which for convenience is designated 32, may be employed, and operated in any suitable manner, and coöperating with said pull-out there will of course be used any well known take-up or reel mechanism for the finished fabric.

I have shown the strand or line wires being fed from any suitable reels or spools and passing up and alongside one side of the bars 29, through the openings or eyes 31, and from the other side of said bars 29 to the pull-out means. If desirable, these wires may be guided up through the bars 29, pass out from one side, thence through the openings or eyes 31 and to the pull-out means.

In operation, when the shaft 21 is rotated, the bars 29 operatively connected thereto, through the bar 24 and arms 23, will be raised and lowered, and the heads of said bars 29 caused to go around the stems 9. This movement of the heads of the bars 29 is made possible through the eccentric connection between the arms 23 and the shaft 21, and the pivotal connection between said links 26 and said arms 23, as described. In normal position, the heads of the bars 29 and the eyes 31 are disposed immediately below the end portions of the stems 9, in Figs. 1 and 8, and when the bars 29 are lifted and their heads caused to go around the stems 9, the strand wires are lifted and carried up and around said stems 9, in the manner seen in Figs. 9 and 10, the bars 29 returning to their lowermost or normal positions, as in Fig. 10, with the loops in the strand wires formed on said stems 9, as in the manner seen in said last-mentioned figure. At or just previous to the completion of the formation of the loops in the strand wires, the stay wire is projected across the machine and the same threaded through the guides 8 and the stems 9, as shown in Fig. 10. The loops having been formed and the stay wire threaded through the guides 8 and the stems 9, the loops are stripped from the stems by moving the bar 4 in the direction of its length, or to the left, looking at Figs. 3 and 11, which will cause the strippers 20 on the blocks 19 to stop the movement of the loops with the stems 9 and allow the stems to pass out of the loops. The strand or line wires are then drawn forward by the pull-out 32 and the reeling means, a distance which it is desired to space the stay wires from each other, such movement lifting the stay wire which will bear against the plates 11 and raise these plates against the tension of the springs 14, see Fig. 12, which act to return the plates to operative position, see Fig. 13, immediately upon the release of the stay from the plates. The pulling strain or tension applied to the strand or line wires will cause the loops in said wires to disappear, and said strand or line wires and said stay wires to be twisted together, as shown in Fig. 2. In this character of fence, as the loops disappear, the fence fabric is shrunk, as shown in Fig. 2, but this feature is not claimed in this application.

What I claim is:—

1. In a wire fence machine, in combination, a wire-guide, a looping member having a wire-receiving opening movable around the axis of said guide, an operating means, and an eccentric connection between said looping member and said operating means.

2. In a wire fence machine, in combination, a stay-wire guide including a hinged part to permit the stay-wire to be removed laterally from said guide, a wire looping member having a substantially circular motion across the axis of said guide, and eccentrically actuated means for operating said member.

3. In a wire fence machine, in combination, a stay-wire guide, said guide having a stem and said guide and stem provided with a stay-wire receiving groove, a looping member having a head formed with an opening for the passage of a strand wire, means for imparting movement to said member, to cause the head thereof to go around the stem of said guide and form a loop in the strand wire, means for moving said guide and stem axially of the stay-wire, and means to engage the loop to strip it from the stem of said guide during the movement thereof.

4. In a wire fence machine, in combination, a stay-wire guide, said guide having a stem and said stem and guide provided with a stay-wire receiving groove, a looping member including an upstanding bar having a head formed with an opening for the passage of a strand wire, a shaft, connections between said shaft and said bar for imparting movement to said bar, to cause the head thereof to go around the stem of said guide and form a loop in the strand wire, means for moving said guide and stem axially of the stay-wire, and means to engage the loop to strip it from the stem of said guide during the movement thereof.

5. In a wire fence machine, in combination, a wire-guide, a looping device comprising an upstanding member having a wire-receiving opening movable around the axis of said guide, a shaft, and an eccentric connection between said shaft and said upstanding member.

6. In a wire fence machine, in combination, an axially movable stay-wire guiding member, a wire looping device comprising an upstanding member having a head normally disposed below said wire guiding member and having an opening forming a wire passage, and means for imparting movement to said member to cause its head and wire passage to describe a substantially circular movement and loop a wire on said guiding member.

7. In a wire fence machine, in combination, an axially movable stay wire guiding member, a wire looping device comprising an upstanding member having a head normally disposed below said wire guiding member and having an opening forming a wire passage, means for imparting movement to said member to cause its head and wire passage to describe a substantially circular movement and loop a wire on said guiding member, and means to strip said loop from said guiding member during the movement of said guiding member.

8. In a wire fence machine, in combination, a member on which a wire may be looped, said member having a wire groove, means for moving said member axially of its wire groove, and a wire looping member, said looping member having movement about said first-mentioned member for looping a wire thereon, and means adapted to strip the wire loop from said first-mentioned member when said member is moved.

9. In a wire fence machine, in combination, a member on which a wire may be looped, said member having a wire receiving groove, a wire looping member, said member being normally disposed immediately below said first-mentioned member and having an eye for the passage of a wire therethrough, and means for imparting movement to said wire looping member to cause the eye thereof to have movement about said first-mentioned member, such movement lifting the wire passing through the eye in said member and passing the wire up, under and around said first-mentioned member to produce a loop in the wire on said member.

10. In a wire fence machine, in combination, a member on which a wire may be looped, said member having a wire receiving groove and adapted to be moved axially of its groove, a wire looping member, said member being normally disposed immediately below said first-mentioned member and having an eye for the passage of wire therethrough, and means for imparting movement to said wire looping member to cause the eye thereof to have movement about said first-mentioned member, such movement lifting the wire passing through the eye in said member and passing the wire up, under and around said first-mentioned member to produce a loop in the wire on said member, the loop in said wire being adapted to be stripped from said first-mentioned member when the same is moved.

11. In a wire fence machine, in combination, a stay wire guiding member, a looping member having an eye for the passage of a wire therethrough, and means for moving said looping member in a direction upwardly to cause the eye thereof to go around the outer surface of said guiding member and to return to its normal position, and during such movement to lift the wire passing through said eye and loop it about said wire guiding member.

12. In a wire fence machine, in combination, a stay-wire guiding member, a looping member having an eye for the passage of a wire therethrough, means for moving said looping member in a direction upwardly to cause the eye thereof to go around the outer surface of said guiding member and return to its normal position, and during such movement to lift the wire passing through said eye and loop it about said wire guiding member, means for moving said guiding member, and means adapted to engage the loop in said wire to strip it from said member during the movement thereof.

13. In a wire fence machine, in combination, a bed plate, a bar movable longitudinally thereof, a plurality of wire guiding members secured on said bar and movable therewith, each member including a hinged part and a spring for holding said hinged part in a normally closed position, a stem projecting from each member, a plurality of upstanding wire looping bars, each looping bar having a head formed with an eye for the passage of a wire therethrough, a shaft, connections between said shaft and said looping bars, the rotation of said shaft adapted through said connections to impart movement to said looping bars, which will cause the same to loop the wires passing through the eyes in said members about the stems of said wire guiding members, and means for stripping said loops from said stems.

14. In a wire fence machine, in combination, a plurality of wire guides in axial alinement, a looping member associated with each guide and having a wire-receiving opening movable around the axis of such guide, a common support for said looping members, an operating shaft, and means connecting said support eccentrically with said shaft.

15. In a wire fence machine, in combination, a plurality of wire looping members, each member having an eye for the passage of a wire therethrough, a common support for all of said members, a shaft, eccentric straps carried on said shaft and connected to said support, and links pivotally connected to said support and also pivotally connected to the frame of the machine.

16. In a wire fence machine, in combination, a plurality of spaced wire guiding members, each of said members having a wire groove, the same being in axial alinement with each other, means for moving said members axially of their grooves, a looping member associated with each wire guiding member, and means for simultaneously actuating said looping members to cause the same to have movement between said guiding members and across the axis of the grooves in said guiding members and to loop a wire on said guiding members.

WILLIAM H. SOMMER.

Copies of this patent may be obtained for five cents each, by addressing the "Commissioner of Patents, Washington, D. C."